United States Patent
Stötzel et al.

(10) Patent No.: US 12,157,163 B2
(45) Date of Patent: *Dec. 3, 2024

(54) SIZING COMPOSITION, METHOD FOR COATING A CASTING MOULD AND USE OF THE SIZING COMPOSITION FOR COATING A CASTING MOULD

(71) Applicant: ASK CHEMICALS GMBH, Hilden (DE)

(72) Inventors: Reinhard Stötzel, Solingen (DE); Christian Koch, Moers (DE); Anne Kowalczyk, Hilden (DE)

(73) Assignee: ASK CHEMICALS GMBH, Hilden (DE)

( * ) Notice: Subject to any disclaimer, the term of this patent is extended or adjusted under 35 U.S.C. 154(b) by 757 days.

This patent is subject to a terminal disclaimer.

(21) Appl. No.: 17/058,370

(22) PCT Filed: May 15, 2019

(86) PCT No.: PCT/EP2019/062480
§ 371 (c)(1),
(2) Date: Nov. 24, 2020

(87) PCT Pub. No.: WO2019/224070
PCT Pub. Date: Nov. 28, 2019

(65) Prior Publication Data
US 2021/0308745 A1    Oct. 7, 2021

(30) Foreign Application Priority Data

May 25, 2018    (DE) .................... 10 2018 004 234.1

(51) Int. Cl.
| | |
|---|---|
| *C04B 33/04* | (2006.01) |
| *B22C 3/00* | (2006.01) |
| *B22C 9/02* | (2006.01) |
| *C04B 35/622* | (2006.01) |
| *C04B 35/626* | (2006.01) |
| *C09D 1/00* | (2006.01) |
| *C09D 1/02* | (2006.01) |

(52) U.S. Cl.
CPC ................ *B22C 3/00* (2013.01); *B22C 9/02* (2013.01); *C04B 33/04* (2013.01); *C04B 35/62222* (2013.01); *C04B 35/6264* (2013.01); *C09D 1/00* (2013.01); *C09D 1/02* (2013.01); *C04B 2235/3481* (2013.01); *C04B 2235/349* (2013.01); *C04B 2235/425* (2013.01)

(58) Field of Classification Search
CPC .............. C09D 1/00; C09D 1/02; C04B 33/04
See application file for complete search history.

(56) References Cited

U.S. PATENT DOCUMENTS

| | | | |
|---|---|---|---|
| 1,990,075 A | 2/1935 | Herak | |
| 3,243,397 A | 3/1966 | Herkimer et al. | |
| 5,840,433 A * | 11/1998 | Juma ...................... | C04B 41/009 427/532 |
| 6,149,723 A * | 11/2000 | Pruett .................... | D21H 19/40 106/486 |
| 11,858,030 B2 * | 1/2024 | Priebe ...................... | B22C 9/02 |
| 2009/0014145 A1 * | 1/2009 | Stotzel ...................... | B22C 3/00 164/47 |
| 2020/0346978 A1 * | 11/2020 | Zhang .................... | C04B 14/106 |

FOREIGN PATENT DOCUMENTS

| | | | | |
|---|---|---|---|---|
| KR | 101375607 B1 * | 3/2014 | ............ | C04B 33/04 |
| WO | WO-2012136430 A1 * | 10/2012 | ............... | C09D 1/02 |
| WO | WO-2021005373 A1 * | 1/2021 | ............... | C03C 8/14 |

OTHER PUBLICATIONS

International Search Report and English Translation thereof for International Application No. PCT/EP2019/062480, mailed Jul. 1, 2019 (6 pages).

* cited by examiner

*Primary Examiner* — Jun Li
(74) *Attorney, Agent, or Firm* — Kagan Binder, PLLC

(57) ABSTRACT

The present invention relates to a coating composition comprising a solid component comprising a clay and mica, wherein the clay comprises from about 50 to about 90% by weight of kaolinite and from about 5 to about 35% by weight of montmorillonite and the coating composition comprises, based on the solid component, from about 5 to about 50 parts by weight of clay. Furthermore, a process for coating a casting mold and the use of the coating composition for coating a casting mold are disclosed.

17 Claims, 1 Drawing Sheet

SIZING COMPOSITION, METHOD FOR COATING A CASTING MOULD AND USE OF THE SIZING COMPOSITION FOR COATING A CASTING MOULD

TECHNICAL FIELD

The present invention relates to a coating composition comprising a solid component comprising a clay and mica. Furthermore, a process for coating a casting mold and the use of the coating composition for coating a casting mold are disclosed.

PRIOR ART

Most products of the iron, steel and nonferrous metals industry go through casting processes for initial shaping. Here, the molten materials, ferrous metals or nonferrous metals, are converted into shaped objects having particular workpiece properties. For shaping of the castings, sometimes very complicated casting molds for accommodating the metal melt firstly have to be produced. The casting molds are divided into expendable molds which are destroyed after each casting operation and permanent molds by means of which a large number of castings can be produced in each case. The expendable molds usually consist of a refractory, particulate base mold material which is strengthened by means of a curable binder.

Molds are negatives: they contain the cavity which is to be filled by casting and yields the casting to be manufactured. The interior contours of the future casting are formed by cores. In the production of the mold, the cavity is formed in the base mold material by means of a model of the casting to be made. Internal contours are represented by cores which are shaped in a separate core box.

To produce the casting molds, use can be made of both organic and inorganic binders which can be cured by cold or hot processes. The term cold processes refers to processes in which curing occurs essentially at room temperature without heating of the mold material mixture.

Curing is in this case usually effected by means of a chemical reaction which can, for example, be triggered by a gaseous catalyst being passed through the mold material mixture to be cured, or by a liquid catalyst being added to the mold material mixture. In hot processes, the mold material mixture is, after shaping, heated to a sufficiently high temperature to drive off, for example, the solvent present in the binder or to initiate a chemical reaction by means of which the binder is cured by crosslinking.

The production of the casting molds can be carried out by firstly mixing the base mold material with the binder so that the grains of the base mold material become coated with a thin film of the binder. The mold material mixture obtained from base mold material and binder can then be introduced into an appropriate mold and optionally compacted in order to achieve sufficient stability of the casting mold. The casting mold is subsequently cured, for example by being heated or by a catalyst being added so as to bring about a curing reaction. When the casting mold has attained at least a certain initial strength, it can be taken from the mold.

As mentioned above, casting molds for the production of metal bodies are frequently made up of cores and molds. Here, the cores and molds have to meet different requirements. In the case of molds, a relatively large surface area is available for conducting away gases which are formed during casting by action of the hot metal. In the case of cores, only a very small area via which the gases can be conducted away is usually available. When there is excessive gas evolution, there is therefore the risk of gas going over from the core into the liquid metal and there leading to formation of casting defects. The internal cavities are therefore often produced by means of sand cores which have been strengthened by means of cold box binders, i.e. a binder based on polyurethanes, while the external contour of the casting is represented by cheaper molds, for example a green sand mold, a mold bonded by a furan resin or a phenolic resin, or by a steel chill casting mold.

For larger molds, organic polymers are usually used as binders for the refractory, particulate base mold material. Washed, classified silica sand is frequently used as refractory, particulate base mold material, but other base mold materials such as zircon sands, chromite sands, chamottes, olivine sands, feldspar-containing sands and andalusite sands are also used. The mold material mixture obtained from base mold material and binder is preferably present in a free-flowing form.

At present, organic binders such as polyurethane binders, furan resin binders or epoxy-acrylate binders, in the case of which curing of the binder is effected by addition of a catalyst, are frequently used for producing casting molds.

The choice of the suitable binder depends on the shape and size of the casting to be produced, the production conditions and also the material used for casting. Thus, polyurethane binders are often used in the production of small castings which are produced in large numbers since these binders allow rapid cycle times and thus also mass production.

The use of two-component polyurethane binders for core production has attained great importance in the foundry industry. Here, one component contains a polyol having at least two OH groups per molecule, while the other contains a polyisocyanate having at least two NCO groups per molecule. In the case of a mold for core production, known as the cold box process, the two components are firstly mixed simultaneously or in succession with a suitable base mold material, e.g. silica sand. This mixture, known as the mold material mixture, is subsequently transferred into the stock vessel of a core shearing machine from which it is conveyed by means of compressed air into a molding tool and cured in this by introduction of a gaseous low-boiling tertiary amine as catalyst, so as to give a solid, self-supporting core (U.S. Pat. No. 3,409,579). As further constituents, the base mold material can additionally contain additives as are described, for example, in EP 0 795 366 A1.

As refractory base mold materials, it is possible to use, for example, silica sand, zircon sand or chrome ore sand, olivine, chamotte and bauxite. Furthermore, synthetically produced base mold materials such as hollow aluminum silicate spheres (known as microspheres), glass beads, glass granules or the spherical ceramic base mold materials known under the name "Cerabeads" or "Carboaccucast" can also be used. Mixtures of the base mold materials mentioned are likewise possible.

As purpose-determining component, coating compositions conventionally contain at least one refractory. The purpose of this refractory is mainly to influence the surface of the casting mold body to be coated in order to meet the abovementioned requirements in respect of avoidance of sand defects which lead to defects in the casting operation and to lack of cleanliness of the casting.

For example, the refractory can close the sand pores of a core or mold in foundry technology in order to prevent intrusion of the metal being cast.

Examples of refractories are pyrophyllite, mica, zirconium silicate, andalusite, chamotte, iron oxide, kyanite, bauxite, olivine, aluminum oxide, quartz, talc, calcined kaolins (metakaolin) and/or graphite, either alone or as mixtures thereof.

Thus, WO 2004/083321 A1 and EP 2 364 795 A1 describe the use of finely particulate material such as metakaolin which can impregnate the sand pores and a platelet-like coarse pyrophyllite which leads to covering of the sand surface and thus leads to good protection against both flash and penetrations.

A coating composition conventionally comprises a carrier liquid. The solid constituents of the coating composition can together with the carrier liquid form a suspension, as a result of which the solid constituents become processable and can be applied by a suitable method, e.g. dipping, to the body to be coated.

In general, the method of application of the coating composition in the coating of porous materials is influenced not only by the rheology of the coating composition but also by the absorptive behavior of the porous body and by the ability of the carrier liquid to be retained by the coating material. As regards the absorptive behavior of porous bodies, it may be remarked that substrates comprising hydraulic binders such as clay, cement and water glass generally absorb the carrier liquid particularly strongly.

In the case of coating compositions based on an aqueous binder system, the use of suspending agents such as mucilages or cellulose derivatives is known. Although these bring about a high water retention capability of the coating material, the rheology of the system is adversely affected in such a way that the coating compositions have disadvantageous, less non-Newtonian properties and run off in a more viscous manner. This can lead to undesirable use features such as droplet and curtain formation and also nonuniform layer thicknesses. Particularly in the case of dipping as method of application, optimization of the running-off behavior of the coating composition is particularly important for achieving contour formation, uniform layer thickness and low droplet formation.

Fundamentally, every coating composition has to be kept in the homogeneous state during processing. In particular, settling of the solids of the suspension has to be avoided. In conjunction with the required application behavior, the rheological character and also the degree of thixotropy of the complex suspensions should meet the desired requirements.

For example, swellably activated sheet silicates are used as thickeners for aqueous systems in numerous fields of industry. For this purpose, the sheet silicates are dispersed in finely divided form in the system by means of shear forces, with the individual sheet platelets becoming largely to completely detached from one another and forming a colloidal dispersion or suspension in the system, leading to a gel structure.

DE 37 040 84 A1 proposes improving the stability of such a gel structure and also the rheological effectiveness of a thickener by adding a long-chain organic polyelectrolyte, for example a polysaccharide or heteropolysaccharide having a total molecular weight of at least 2 million, to a swellably activated sheet silicate. In addition, the components can be reacted with primary or secondary amines and/or an aminofunctional silane in order to increase the rheological effectiveness.

EP 0 751 103 A1 discloses the use of uncalcined smectite clays and organic additives in order to increase the strength of clay compositions for slip casting of ceramic objects having complex shapes.

U.S. Pat. No. 5,164,433 discloses a thickener for aqueous systems, which comprises a clay material, starch and a polymer or copolymer of an unsaturated carboxylic acid, a modified unsaturated carboxylic acid and/or a vinyl monomer.

EP 0 509 202 A1 describes a rheological additive which comprises clay, a polymeric material and starch. The clay is selected from among montmorillonite, bentonite, hectorite, kaolin, illite, saponite, attapulgite, sepiolite and mixtures thereof. A water-based coating composition comprising a pigment, latex extender and such a rheological additive is furthermore described.

U.S. Pat. No. 5,120,465 describes a thickener which is suitable for giving an ionic detergent thixotropic properties, with the thickener comprising a mixture of kaolinite clay and non-kaolinite clay selected from among smectite clay, attapulgite clay and mixtures thereof and the kaolinite clay comprising kaolin particles and at least about 50% by weight of the particles having a particle size of less than 2 μm equivalent sphere diameter, and also a detergent composition comprising such a thickener.

U.S. Pat. No. 5,735,943 describes a dry, rheological additive for organic fluid systems, comprising (a) one or more organoclays, produced by reacting smectite clay or one or more organic cations, and (b) one or more fibrous materials.

However, the known thickeners do not always satisfy the specific requirements in respect of controlling the application behavior of coating compositions for porous bodies, and important properties of the coating compositions are not at the same time optimally set.

WO 2004/083321 A1 describes the use of a rheological additive which comprises the constituents illite-containing clay:smectite:attapulgite in this order in a ratio of 1-100:1-100:1-100, preferably 1-30:1-20:1-20. These coating compositions preferably comprise from 0.1 to 10% by weight of the illite-containing clay, from 0.1 to 10% by weight of smectite and from 0.1 to 10% by weight of attapulgite. In a particularly preferred embodiment, a coating composition comprises from 0.1 to 3.0% by weight of the illite-containing clay, from 0.1 to 2.0% by weight of smectite and from 0.1 to 2.0% by weight of attapulgite.

One process for producing casting molds and cores from mold sand bonded by synthetic resin comprises, for example, producing a basic mold or a basic core from the mold sand and applying a mold coating containing refractory inorganic constituents, which is also referred to as coating composition, at least to those surfaces of the basic mold/basic core which come into contact with the cast metal. The mold coatings have the purpose of influencing the molded part surface, improving the appearance of the casting, metallurgically influencing the casting and/or avoid casting defects. Furthermore, these coatings or coating compositions have the function of chemically isolating the mold from liquid metal during casting, which prevents possible adhesion and allows later separation of mold and casting. In addition, the coating composition ensures thermal separation of molding and casting. If this function is not fulfilled, a metal mold is, for example, subjected to such thermal stresses during the course of successive casting operations that it is prematurely destroyed. Heat transfer can be utilized in a targeted manner to influence the cooling of the casting. In the manufacture of cold box cores, problems concerning expansion defects of the sand occur again and again in practice and lead, owing to the quartz inversion in the transformation of α into β quartz and a longitudinal expansion of about 1% and about 580° C., to stresses in the core surface. This results in flash (torn-open cores with metal which has intruded) or flakes (flaked-off sand layer), which lead to a raised casting surface and to sand inclusions in other places.

A further subject is the increasing demand by automobile foundries for castings having water- or oil-conducting cavities, for example water jacket or oil channels, which are free of dirt.

Since these are relatively difficult to clean because of poor accessibility, there is a need for coating compositions which satisfy this requirement. In recent years, smoother surfaces of internal casting contours have been increasingly required. These ideally have a roughness Rz of less than 25.

WO 2011/110798 A1 describes a foundry coating composition comprising a liquid carrier; a binder; and a particulate refractory filler; with the particulate refractory filler comprising a first relatively coarse fraction having a particle size of d>38 µm and a second relatively fine fraction having a particle size of d<38 µm and not more than 10% of the total particulate refractory solid having a particle size of 38 µm<d<53 µm and from 0 to 50% of the second relatively fine fraction consisting of calcined kaolin.

DE 10 2009 032668 A1 describes a ready-to-used coating composition for producing mold coatings on expendable molds or on cores for iron and steel casting, where the coating composition contains a proportion by weight of 0.001% or more and less than 1% of inorganic hollow bodies, characterized in that the inorganic hollow bodies consist partially or completely of crystalline material.

WO 2006/063696 A1 describes a coating composition for casting molds, comprising a solvent component and a solid component, characterized in that the solid component comprises a mixture of metakaolinite and pyrophyllite as main constituent.

It was an object of the present invention to provide a coating composition which ensures a low level of residual dirt after casting.

It has surprisingly been found that a combination of a clay and mica where the clay comprises from about 50 to about 90% by weight of kaolinite and from about 5 to about 35% by weight of montmorillonite, optionally together with metakaolinite and/or graphite, can meet the abovementioned requirement very well.

In addition, the coating composition of the invention can decrease flash, penetration, gas defects and/or flakes. It has also been found that the refractory nature and finely particulate nature (impregnation of the voids in the sand) of the clay leads to excellent properties in respect of protection against penetration. In particular, the high insulation values of the coating composition bring about very good protection against flash, which is frequently observed in the case of silica sand as a result of the thermal expansion of the silica sand (quartz inversion) and the unsatisfactory thermal strength, especially in the case of polyurethane cold box cores. Furthermore, the coating composition can easily be peeled off from the casting after the casting operation.

BRIEF DESCRIPTION OF THE INVENTION

Figure 1:
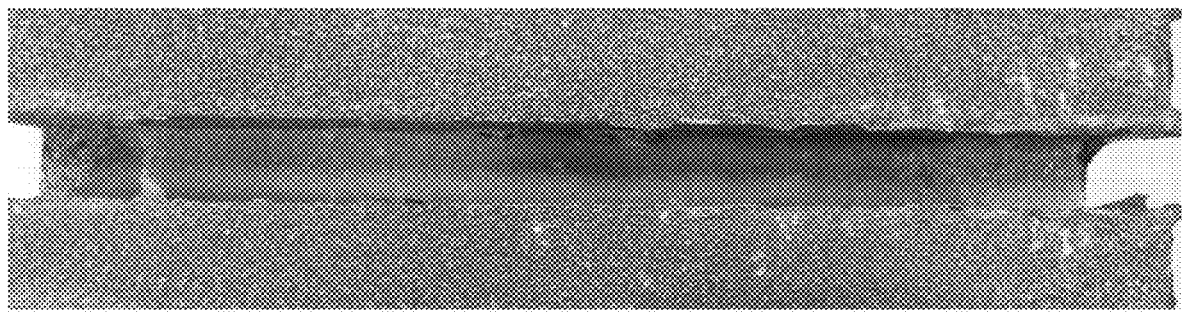
FIG. 1: casting obtained using the composition of the invention. The casting has a small amount of residue and no casting defects.

Accordingly, the present invention concerns the following points.

(1) A coating composition comprising a solid component comprising a clay and mica, wherein the clay comprises from about 50 to about 90% by weight of kaolinite and from about 5 to about 35% by weight of montmorillonite and the coating composition comprises, based on the solid component, from about 5 to about 50 parts by weight of clay.

(2) The coating composition according to (1), wherein the coating composition comprises, based on the solid component, from about 10 to about 80 parts by weight, preferably from about 20 to about 70 parts by weight and particularly preferably from about 30 to about 65 parts by weight, of mica.

(3) The coating composition according to (1) or (2), wherein the ratio of mica to clay is from about 1:1 to about 5:1, preferably from about 1.3:1 to about 3:1, particularly preferably from about 1.4:1 to about 2.5:1 (weight/weight).

(4) The coating composition according to any of points (1) to (3), wherein the solid component further comprises metakaolinite and/or graphite.

(5) The coating composition according to any of points (1) to (4), wherein the sum of clay, mica, metakaolinite and graphite is, based on the solid component, from about 20 to about 100% by weight, preferably from about 25 to about 100% by weight and particularly preferably from about 30 to about 100% by weight.

(6) The coating composition according to any of points (1) to (5), wherein the coating composition comprises, based on the solid component, from about 5 to about 40 parts by weight and preferably from about 5 to about 35 parts by weight, of clay.

(7) The coating composition according to any of points (1) to (6), wherein the coating composition comprises, based on the solid component, from about 0 to about 35 parts by weight, preferably from about 0 to about 30 parts by weight and particularly preferably from about 0 to about 25 parts by weight, of metakaolinite.

(8) The coating composition according to any of points (1) to (7), wherein the coating composition comprises, based on the solid component, from about 0 to about 30 parts by weight, preferably from about 0 to about 25 parts by weight and particularly preferably from about 0 to 20 parts by weight, of graphite.

(9) The coating composition according to any of points (1) to (8), wherein the coating composition further comprises a carrier liquid, with the carrier liquid comprising water.

(10) A process for coating a casting mold, wherein the process comprises the steps:
(a) provision of a casting mold comprising a surface which defines a casting cavity,
(b) provision of a coating composition according to any of points (1) to (9);
(c) application of a layer of the coating composition to at least one part of the surface which defines the casting cavity; and
(d) drying of the coating composition.

(11) Use of a coating composition according to any of points (1) to (9) for coating a casting mold, wherein the casting mold has a surface which defines a casting cavity and a layer of the coating composition is applied to at least part of the surface which defines the casting cavity.

(12) A coated casting mold obtainable by the process according to (10).

DETAILED DESCRIPTION OF THE INVENTION

The present invention provides a coating composition comprising a solid component comprising a clay and mica, wherein the clay comprises from about 50 to about 90% by weight of kaolinite and from about 5 to about 35% by weight of montmorillonite and the coating composition comprises, based on the solid component, from about 5 to about 50 parts by weight of clay. All components which are present as solids after drying of the ready-to-use coating composition are counted as part of "a solid component".

Clay

Clay is a naturally occurring material which consists mainly of clay mineral particles, is generally plastically deformable at sufficient water contents and becomes brittle when it is dried or fired. Clay minerals contain sheet silicates.

The clay used in the coating composition of the invention contains, according to the present invention, from about 50 to about 90% by weight of kaolinite; the clay can preferably contain from about 55 to about 85% by weight, particularly preferably from about 55 to about 80% by weight, of kaolinite.

Furthermore, the clay used in the coating composition of the invention contains from about 5 to about 35% by weight of montmorillonite; the proportion of montmorillonite can preferably be from about 10 to about 30% by weight.

The clay used can additionally contain illite. The proportion of illite is not subject to any particular restrictions and can preferably be from about 0% by weight to about 20% by weight, more preferably from about 0% by weight to about 15% by weight, particularly preferably from about 5% by weight to about 15% by weight, based on the total amount of clay.

The clay can additionally contain quartz. The proportion of quartz is not subject to any particular restrictions and can preferably be from about 0% by weight to about 20% by weight, more preferably from about 0% by weight to about 15% by weight, particularly preferably from about 0% by weight to about 12% by weight, based on the total amount of clay.

The clay can additionally contain iron-titanium minerals. The proportion of iron-titanium mineral is not subject to any particular restrictions and can preferably be from about 0% by weight to about 10% by weight, more preferably from about 0% by weight to about 7% by weight, particularly preferably from about 0% by weight to about 5% by weight, based on the total amount of clay.

In one embodiment, the clay can contain further constituents. These constituents are preferably present in a proportion of from about 0% by weight to about 25% by weight, preferably from about 0% by weight to about 5% by weight, particularly preferably from about 0% by weight to about 1% by weight. In one embodiment, the constituent can be mica. The proportion of the mica is not subject to any particular restrictions and the proportion of this can preferably be from about 0% by weight to about 25% by weight, more preferably from about 0% by weight to about 5% by weight. The clay particularly preferably contains 0 parts by weight of mica.

In a further embodiment, the constituent can be a sheet silicate other than mica, selected from the group consisting of attapulgite, pyrophyllite, serpentines, saponite, beidellite, nontronite, vermiculite, spiolite, synthetic lithium-magnesium sheet silicate Laponite RD or mixtures thereof. The proportion of the sheet silicate other than mica is not subject to any particular restrictions and can preferably be from about 0% by weight to about 25% by weight, more preferably from about 0% by weight to about 5% by weight. The clay more preferably contains 0% by weight of sheet silicate other than mica, and particularly preferably contains 0% by weight of attapulgite and pyrophyllite.

Combinations of the above ranges and preferred ranges of the clay components are of course likewise possible.

In a preferred embodiment, the clay contains from about 50 to about 90% by weight of kaolin, from about 5 to about 35% by weight of montmorillonite, from about 0% by weight to about 20% by weight of illite, from about 0% by weight to about 20% by weight of quartz, and from about 0% by weight to about 10% by weight of iron-titanium minerals and from 0 to 5% by weight of mica or sheet silicates other than mica (preferably 0% by weight of mica or sheet silicates other than mica).

In a preferred embodiment, the clay contains from about 55 to about 80% by weight kaolinite, from about 10 to about 30% by weight of montmorillonite, from about 5% by weight to about 15% by weight of illite, from about 0% by weight to about 12% by weight of quartz, from about 0% by weight to about 5% by weight of iron-titanium minerals and from 0 to 5% by weight of mica or sheet silicates other than mica (preferably 0% by weight of mica or sheet silicates other than mica).

Since clay contains aluminosilicates, the composition can be analyzed by means of RFA/EDX (X-ray fluorescence analysis/energy-dispersive X-ray spectroscopy) and the aluminum content (converted to $Al_2O_3$) and the silicon content (converted to $SiO_2$) can be reported. The $Al_2O_3$ content of the clay is not subject to any particular restrictions, but the clay can preferably have a proportion of $Al_2O_3$ of from about 30% by weight to about 45% by weight, more preferably of from about 35% by weight to about 40% by weight, particularly preferably from about 36% by weight to about 38% by weight, based on the total amount of clay. The $SiO_2$ content of the clay is not subject to any particular restrictions. However, the clay can preferably have a proportion of $SiO_2$ of from about 45% by weight to about 70% by weight, more preferably from about 50% by weight to about 65% by weight, particularly preferably from about 52% by weight to about 62% by weight, based on the total amount of clay.

Furthermore, the loss on ignition of the clay is not subject to any particular restrictions. The loss on ignition can preferably be from about 9% by weight to about 18% by weight, more preferably from about 11% by weight to about 16% by weight, particularly preferably from about 12% by weight to about 15% by weight. The loss on ignition can be determined in accordance with DIN 51081.

The particle size distribution of the individual constituents of the coating composition can be determined with the aid of the sieving percentiles D90, D50, D10 and D01. These are a measure of the particle size distribution. Here, the sieving percentiles D90, D50, D10 and D01 are the sizes at which 90%, 50%, 10% and 1%, respectively, of the particles pass through a sieve having a mesh opening corresponding to the particle size fraction indicated.

At a D10 value of, for example 5 μm, 10% of the particles have a size of less than 5 μm. The particle size and the sieving percentiles D90, D50, D10 and D01 can be determined by means of laser diffraction granulometry in accordance with ISO13320. The sieving percentiles are reported on a volume basis. In the case of nonspherical particles, a hypothetical spherical particle size is calculated and used as a basis.

The particle size of the clay is not subject to any particular restrictions and any known particle size can be used. The sieving percentile D10 of the clay can preferably be from about 0.01 µm to about 5 µm, more preferably from about 0.01 µm to about 1 µm, particularly preferably from about 0.01 µm to about 0.2 µm. The clay can preferably have a sieving percentile D01 of from about 0.001 µm to about 0.2 µm, more preferably from about 0.001 µm to about 0.1 µm, particularly preferably from about 0.001 µm to about 0.05 µm.

The proportion of the clay, based on the solid component of the coating composition, is, according to the present invention, from about 5 to about 50 parts by weight. The proportion of the clay can preferably be from about 5 to about 40 parts by weight, more preferably from about 5 to about 35 parts by weight.

Mica

The coating composition additionally contains mica. Micas are sheet silicates in which the tetrahedra of silicon and oxygen are joined in characteristic layers between which there are only very weak bonding forces. The tabular crystals of the minerals can therefore be easily split at these layers. Hexagonal elastically deformable platelets which have become assembled in flake-like aggregates are frequently found.

Micas have the chemical composition $I_{0.5-1}M_{2-3}[T_4O_{10}A_2]$.

In this formula, the symbols have the following meanings:
I: 12-fold coordinated cations (K, Na, Ca, Ba, Rb, Cs, $NH_4$)
M: 6-fold coordinated cations (Li, Mg, $Fe^{2+}$, Mn, Zn, Al, $Fe^{3+}$, Cr, V, Ti)
T: 4-fold coordinated cations (Si, Al, $Fe^{3+}$, B, Be)
A: Anion ($OH^-$, $F^-$, $Cl^-$, $O^{2-}$, $S^{2-}$)

In this context, the coordination of a cation refers to the number and type of its nearest neighbors. A 12-fold coordinated cation, e.g. in micas, is surrounded by 12 oxygen atoms. The dominant ions in each case are emphasized in bold. The ions in parentheses can occur in any mixture, but are always present in the same ratio to the other atom groups (substitution).

Structurally, the micas are characterized by layers of $TO_4$ tetrahedra and $MO_6$ octahedra. A layer of octahedra is enclosed herein by 2 layers of tetrahedra. Among one another, these T-O-T sandwiches are joined only very weakly by means of large interlayer cations bearing a low charge (I: interlayer: between the layers).

A characteristic of the minerals of the mica group is the perfect cleavability parallel to these packets of layers. They have a low hardness of from 2 (parallel to the planes of the layers) to 4 (all other directions).

Micas are among the most abundant rock-forming minerals and are important constituents of many igneous (granites, diorites, pegmatites . . . ) and metamorphic (mica shales, gneisses) rocks.

The classification and nomenclature of the mica group is made according to the occupation of the I position, i.e. the cation position between the T-O-T sandwiches, into three subgroups:
True micas: Micas having more than 50% of monovalent cations in the I position
Brittle micas: Micas having more than 50% of divalent cations in the I position
Interlayer-deficient micas: Micas having less than 0.85 positive charges per formula unit in the I position These subgroups are in turn subdivided according to the occupation of the octahedrally coordinated M position:
Dioctahedral micas: Micas having less than 2.5 cations in the M position
Trioctahedral micas: Micas having more than 2.5 cations in the M position The various micas of the individual subgroups with their idealized compositions are shown below:

True Micas
Dioctahedral (Muscovite Series) Example
Muscovite: K $Al_2[AlSi_3O_{10}(OH)_2]$
Trioctahedral (Biotite Series) Example
Phlogopite: K $Mg^{2+}_3[AlSi_3O_{10}(OH)_2]$
Brittle Micas: (Dana: Margarite Subgroup; Strunz: Lepidolite Series)
Dioctahedral Example
Margarite: Ca $Al_2[Al_2Si_2O_{10}(OH)_2]$
Trioctahedral Example
Clintonite: Ca $Mg_2Al[Al_3Si\ O_{10}(OH)_2]$
Interlayer Deficient Micas: (Dana: Hydromica; Strunz: Glauconite Series)
Dioctahedral Example
Illite (series): $K_{0.65}Al_2[Al_{0.65}Si_{3.35}O_{10}(OH)_2]$
Glauconite (series): $K_{0.8}R^{3+}_{1.33}R^{2+}_{0.67}[Al_{0.13}Si_{3.87}O_{10}(OH)_2]$
Trioctahedral Example
Wonsenite: $Na_{0.5}Mg_{2.5}Al_{0.5}[Al\ Si_3O_{10}(OH)_2]$ Some traditional names are permissible as designations for mixed crystal compositions when more precise characterization is not possible.

Biotite: Dark lithium-free mica having compositions between annite, phlogopite, siderophyllite and eastonite.
Zinnwaldite: Dark lithium-containing mica having compositions between siderophyllite and polylithionite.
Lepidolite: Lithium-rich trioctahedral mica having compositions between trilithionite and polylithionite.
Glauconite: Dioctahedral interlayer-deficient mica having more than 15% of divalent cations in the M position and predominantly $Fe^{3+}$ as trivalent cation in the M position
Illite: Dioctahedral interlayer-deficient mica having less than 25% of divalent cations in the M position and predominantly Al as trivalent cation in the M position According to the present invention, the type of mica is not subject to any particular restrictions; any known mica can be used. The mica can preferably be selected from micas of the muscovite series, for example aluminoseladonite, boromuscovite, chromophyllite, chromoseladonite, ferro-aluminoseladonite, ferroseladonite, ganterite, muscovite, nanpingite, paragonite, roscoelite, seladonite, tobelite, the biotite series, for example annite, aspidolite, eastonite, ephesite, fluorannite, fluorophlogopite (IMA2006-011), hendricksite, masutomilite, montdorite, norrishite, phlogopite, polylithionite, preiswerkite, shirokshinite, shirozulite, siderophyllite, sokolovaite, tainiolite, tetraferriannite, tetraferriphlogopite, trilithionite, voloshinite, the glauconite series, for example brammallite, glauconite, illite, wonesite, the lepidolite series, for example anandite, bityite, chernykhite, clintonite, ferrokinoshitalite, kinoshitalite, margarite, oxykinoshitalite, zinnwaldite or mixtures thereof; the mica can more preferably be selected from the group consisting of phlogopite and muscovite and the mica can particularly preferably be muscovite.

The particle size of the mica is not subject to any particular restrictions: any particle size can be used. The sieving percentile D90 can preferably be from about 100 µm to about 300 µm, more preferably from about 150 µm to about 250 µm, particularly preferably from about 200 µm to about 250 µm. The sieving percentile D50 of the mica can preferably be from about 45 µm to about 125 µm, more preferably from about 63 µm to about 125 µm, particularly preferably from about 75 µm to about 125 µm. The sieving percentile D10 can preferably have a particle size of from about 1 µm to about 63 µm, more preferably from about 5 µm to about 45 µm, particularly preferably from about 10 µm to about 45 µm. The sieving percentile D01 can preferably be from about 0.1 µm to about 10 µm, more preferably from about 0.5 µm to about 10 µm, particularly preferably from about 1 µm to about 5 µm.

The shape of the mica is not subject to any particular restrictions: any known shape can be used but the mica can preferably have a tabular shape. The aspect ratio (length-to-thickness ratio) of the mica can preferably be from about 10 to about 60, more preferably from about 10 to about 40, particularly preferably from about 20 to about 30.

The proportion of mica in the coating composition is not subject to any particular restrictions. The proportion of mica in the coating composition can preferably be from about 10 to about 80 parts by weight, more preferably from about 20 to about 70 parts by weight, particularly preferably from about 30 to about 65 parts by weight, based on the solid component.

The ratio of the individual constituents in the coating composition relative to one another is not subject to any particular restrictions; the constituents clay and mica can be present in any weight ratio. The ratio of mica to clay can preferably be from about 1:1 to about 5:1, preferably from about 1.3:1 to about 3:1, particularly preferably from about 1.4:1 to about 2.5:1 (weight/weight).

Metakaolinite

The coating composition can preferably additionally contain metakaolinite in order to achieve a reduction in penetration defects. Metakaolinite is calcined kaolinite and obtainable from natural kaolinite. The metakaolinite is not subject to any particular restrictions; it is possible to use any known metakaolinite. Metakaolinite can preferably be obtained from natural kaolinite by removing the major part of the impurities and heating the resulting material at a temperature of from about 750° C. to about 950° C. for a time of from about 1 to about 6 hours. Dehydroxylation takes place as a result of heating. The degree of dehydroxylation is not subject to any particular restrictions; the residual content of constitution water, analyzed by DTG, can preferably be 2% by weight or less, with particular preference being given to the constitution water being completely removed. The metakaolinite can, for example, have an Al content (expressed as $Al_2O_3$ content) of from about 40 to about 50% by weight and an Si content (expressed as $SiO_2$ content) of from about 60 to about 50% by weight. Particularly preferred metakaolinite materials are, for example, obtainable under the product designation Satintone W from BASF Ludwigshafen, Germany.

The loss on ignition of the metakaolinite is not subject to any particular restrictions; it can preferably be 3% by weight or less, particularly preferably 1% by weight or less, measured in accordance with DIN 38414.

The uncompacted bulk density of the metakaolinite is not subject to any particular restrictions; it can preferably be from about 100 g/l to about 300 g/l, more preferably from about 150 g/l to about 200 g/l, determined in accordance with DIN 53194.

The specific surface area of the metakaolinite is not subject to any particular restrictions; it is preferably, expressed as oil absorption measured in accordance with DIN 53109, from about 50 to about 120%, more preferably from about 85 to about 120%.

Furthermore, the particle size of the metakaolinite is not subject to any particular restrictions, but the sieving percentile D90 is preferably from about 1 µm to about 20 µm, more preferably from about 2 to about 10 µm. The sieving percentile D50 of the metakaolinite is likewise not subject to any particular restrictions, but can preferably be from about 1 µm to about 10 µm, more preferably from about 1 to about 8 µm, particularly preferably from about 1 to about 5 µm. The sieving percentile D10 of the metakaolinite can preferably be from about 0.1 µm to about 3 µm, more preferably from about 0.1 µm to about 2 µm, particularly preferably from about 0.1 µm to about 1 µm. The sieving percentile D01 of the metakaolinite can likewise preferably be from about 0.01 µm to about 0.4 µm, more preferably from about 0.01 µm to about 0.3 µm, particularly preferably from about 0.01 µm to about 0.2 µm.

The proportion of metakaolinite in the coating composition is not subject to any particular restrictions. Metakaolinite can preferably be present in a proportion of from about 0 to about 35 parts by weight, more preferably from about 0 to about 30 parts by weight, particularly preferably from about 0 to about 25 parts by weight, based on the solid component.

Graphite

The coating composition can optionally contain graphite in order to achieve a shiny cast surface. Graphite is a very abundant mineral of the mineral class of the elements and belongs to the classification of semimetals and nonmetals. Apart from diamond and fullerene, it is the third most stable form (modification) of carbon occurring under normal conditions on Earth and usually crystallizes in the hexagonal crystal system, very rarely also in the rhombohedral crystal system. Graphite develops opaque, gray to black crystals which have a hexagonal, tabular, flake-like or rod-like shape and have a metallic gloss on the crystal faces. Bulk or granular aggregates, on the other hand, are matt. Its Mohs hardness is in the range from 1 to 2, its density is from about 2.1 to 2.3 and it gives a gray-black streak. Graphite occurs in nature in the form of isolated flocs and grains in carbon-rich, metamorphic rock and as veins in pegmatite. In crystalline graphite, parallel planar layers, the "basal planes" or "graphene layers", occur. The extreme directionality of the bonding forces in graphite results in distinct anisotropy of the mechanical, electrical and thermal properties of graphite:

Ready cleavability of pure graphite along the basal planes, significantly higher strength along the crystal layers;

thermal and electrical insulation orthogonal to the basal planes compared to a virtually metallic conductivity along the planes.

The graphite which is used according to the invention is not subject to any particular restrictions and any commercial graphite can be present in the coating. The graphite can preferably be natural macrocrystallite graphite. The graphite is preferably floc graphite.

The carbon content of the graphite is not subject to any particular restrictions; the carbon content of the graphite can preferably be about 65% by weight or more, preferably about 75% or more, more preferably about 85% or more, particularly preferably about 95% or more, based on the total weight of the graphite.

The aspect ratio (length-to-thickness ratio) of the graphite can preferably be from about 5 to about 50, more preferably from about 5 to about 20, particularly preferably from about 10 to about 20.

Furthermore, the particle size of the graphite is not subject to any particular restrictions: any customary grain size can be used, but the sieving percentile D90 is preferably from about 100 µm to about 350 µm, more preferably from about 100 µm to about 300 µm, particularly preferably from about 150 µm to about 280 µm. Furthermore, the sieving percentile D50 is preferably from about 45 µm to about 150 µm, more preferably from about 60 µm to about 140 µm, particularly preferably from about 63 µm to about 125 µm. The sieving percentile D10 can preferably be from about 1 µm to about 75 µm, more preferably from about 1 µm to about 45 µm, particularly preferably from about 1 µm to about 35 µm. The sieving percentile D01 can likewise preferably be from about 0.1 µm to about 10 µm, more preferably from about 0.5 µm to about 5 µm, particularly preferably from about 1 µm to about 5 µm.

The proportion of graphite in the coating composition is not subject to any particular restrictions, but this can preferably be, based on the solid component, from about 0 to about 30 parts by weight, more preferably from about 0 to about 25 parts by weight, particularly preferably from about 0 to about 20 parts by weight.

The sum of clay, mica, metakaolinite and graphite in the coating composition is not subject to any particular restrictions. The sum can usually be from about 20 to about 100% by weight, preferably from about 25 to about 100% by weight and particularly preferably from about 30 to about 100% by weight, based on the solid components. In a preferred embodiment, a coating composition according to the invention has a composition comprising from about 30 to about 65% by weight of mica, from about 5 to about 35% by weight of clay, from about 0 to about 20% by weight of graphite, from about 0 to about 25% by weight of metakaolinite and optionally from about 0.1 to about 2% by weight of sheet silicate other than mica (for example attapulgite), based on the solid component. In a more preferred embodiment, a coating composition according to the invention has a composition comprising from about 30 to about 65% by weight of muscovite mica, from about 5 to about 35% by weight of clay, from about 0 to about 20% by weight of natural floc graphite, from about 0 to about 25% by weight of metakaolinite and optionally from about 0.1 to about 2% by weight of attapulgite, based on the solid component.

Carrier Liquid

The coating composition can contain a carrier liquid to simplify application. The term carrier liquid refers to all constituents which are volatilized by the drying of the ready-to-use coating composition and are not present in liquid form in the dried coating composition.

The coating composition can be provided as dry powder, as concentrate which contains part of the required amount of carrier liquid and is intended to be diluted with further carrier liquid before use or as ready-to-use coating composition which already contains the desired amount of carrier liquid.

The carrier liquid can be selected by a person skilled in the art according to the envisaged use. The carrier liquid can preferably be selected from among water, alcohols such as aliphatic C1-C5-alcohols and mixtures thereof. In a preferred embodiment, the carrier liquid is water, methanol, ethanol, n-propanol, isopropanol, n-butanol or a mixture thereof, particularly preferably water, ethanol, isopropanol or a mixture thereof; the carrier liquid can more preferably be water.

Coating compositions in which the carrier liquid consists mainly of water are usually referred to as aqueous coating compositions. Coating compositions in which the carrier liquid consists mainly of alcohol or alcohol mixtures are referred to as alcohol coating compositions. In one embodiment of the present invention, the carrier liquid comprises from about 0 to about 100% by weight, preferably from about 20 to about 80% by weight, more preferably from about 40 to about 60% by weight, of water and, as further component, from about 100 to about 0% by weight, preferably from about 80 to about 20% by weight, more preferably from about 60 to about 40% by weight, of one or more alcohols as defined above, based on the carrier liquid. According to the invention, it is possible to use either pure aqueous coating compositions or pure alcohol coating compositions and also water/alcohol mixtures. In a particularly preferred embodiment, water is the sole carrier liquid. As an alternative, it is also possible to produce coating compositions whose solvent component consists of alcohol or in the case of hybrid coating compositions initially only of water. Dilution with an alcohol or an alcohol mixture enables these coating compositions to be used as alcohol coating compositions. Preference is given here to using ethanol, propanol, isopropanol and mixtures thereof.

If required, further organic solvents can be used. Examples are alkyl acetates such as ethyl acetate and butyl acetate, and ketones such as acetone and methyl ethyl ketone. The proportion of the further organic solvents is not subject to any particular restrictions; it can preferably be from about 0 to about 10% by weight, more preferably from about 0 to about 5% by weight, particularly preferably from about 0 to about 1% by weight, based on the carrier liquid.

The proportion of the carrier liquid in the coating composition is not subject to any particular restrictions; it can preferably be 80% by weight or less, more preferably 75% by weight or less, particularly preferably 70% by weight or less.

Accordingly, the proportion of the solid component in the coating composition is preferably about 20% by weight, more preferably about 25% by weight, particularly preferably about 30% by weight.

In the ready-to-use coating composition, the proportion of carrier liquid is preferably from about 50 to about 85% by weight, more preferably from about 42 to about 85% by weight, particularly preferably from about 55 to about 85% by weight.

Accordingly, the proportion of the solid component in the ready-to-use coating composition is preferably from about 15 to about 50% by weight, more preferably from about 15 to about 48% by weight, particularly preferably from about 15 to about 45% by weight.

Swellable Sheet Silicates

The coating composition can optionally contain one or more swellable sheet silicates in order to reduce sedimentation and control the rheology. These are different from the above-defined clay, metakaolinite and mica. The swellable sheet silicates are not subject to any particular restrictions. Every swellable sheet silicate known to a person skilled in the art which is capable of intercalating water between the layers can additionally be present; the swellable sheet silicate can preferably be selected from among attapulgite (palygorskite), serpentines, kaolins, smectites (for example saponite, montmorillonite, beidellite and nontronite), vermiculite, illite, spiolite, synthetic lithium-magnesium sheet silicate Laponite RD and mixtures thereof, particularly preferably attapulgite (palygorskite), serpentines, smectites (for example saponite, beidellite and nontronite), vermiculite, illite, spiolite, synthetic lithium-magnesium sheet silicate Laponite RD and mixtures thereof, and the swellable sheet silicate can particularly preferably be attapulgite. Attapulgite is preferably used because it increases the yield point.

Furthermore, the particle size of the swellable sheet silicates is not subject to any particular restrictions; it is possible to use any particle size but the sieving percentile D01 can preferably be from about 0.01 µm to about 20 µm, particularly preferably from about 0.01 µm to about 10 µm.

The proportion of the swellable sheet silicates (in particular attapulgite) in the coating composition is not subject to any particular restrictions but can preferably be from about 0 to about 5 parts by weight, more preferably from about 0.1 to about 5 parts by weight, particularly preferably from about 0.1 to about 4 parts by weight, even more preferably from about 0.1 to 2 parts by weight, based on the solid component.

Nonswellable Sheet Silicates

The coating composition can optionally additionally contain one or more nonswellable sheet silicates which contribute to controlling the rheology. These are different from the above-defined clay, metakaolinite, mica and the swellable sheet silicates. The nonswellable sheet silicates are not subject to any particular restrictions: any nonswellable sheet silicate known to a person skilled in the art can be used. The nonswellable sheet silicate can preferably be selected from among pyrophyllite and talc, and the nonswellable sheet silicate can particularly preferably be pyrophyllite.

Furthermore, the particle size of the nonswellable sheet silicates is not subject to any particular restrictions; any customary particle size can be a particle size of from about 1 µm to about 300 µm, particularly preferably from about 1 µm to about 200 µm.

The proportion of the nonswellable sheet silicates (in particular pyrophyllite) based on the solid component of the coating composition is not subject to any particular restrictions; it can preferably be from about 0 to about 50 parts by weight, more preferably from about 0 to about 45 parts by weight, particularly preferably from about 0 to about 40 parts by weight, even more preferably from about 0 to 35 parts by weight, based on the solid component.

Optional Additives

Apart from the above constituents, the coating composition can contain customary additives such as binders, wetting agents, antifoams, pigments, dyes and biocides.

Binders

The task of a binder is first and foremost to bind the solid component. The binder preferably cures irreversibly and thus gives an abrasion-resistant coating on the casting mold. The abrasion resistance is of great importance for the finished coating since the coating can be damaged in the case of a lack of abrasion resistance. In particular, the binder should not resoften due to atmospheric moisture. In preferred embodiments, curing of the binder is carried out in a manner known per se. For example, in the case of acrylate systems, curing can be carried out using free radical formers which, for example, form free radicals on irradiation with UV light. According to the invention, it is possible to use all binders which are conventionally employed in, for example, aqueous and/or water-alcohol systems. As binders, it is possible to use, for example, starches, dextrin, peptides, polyvinyl alcohol, polyvinyl acetate copolymers, polyacrylic acid, polystyrene, polyvinyl acetate-polyacrylate dispersions and mixtures thereof. In a preferred embodiment of the invention, the binder comprises a dispersion of an alkyd resin which is soluble both in water and in lower (for example $C_{1-4}$) alcohols such as ethanol, propanol and isopropanol. Examples of alkyd resins are unmodified water-dispersible alkyd resins based on a natural oil or fatty acids thereof with polyalcohols, as are described, for example, in U.S. Pat. No. 3,442,835, or isocyanate-modified alkyd resins as are described, for example, in U.S. Pat. No. 3,639,315 and which are preferred, or epoxide-urethane-modified alkyd resins as described in DE 43 08 188. For example, it is possible to use products of the Necowel range from ASK Chemicals GmbH, 40721 Hilden, Germany.

Further preferred binders are polyvinyl alcohols and polyvinyl acetate copolymers, in particular polyvinyl alcohols.

The binders are preferably used in an amount of from about 0.1 to about 5 parts by weight, more preferably from about 0.2 to about 2 parts by weight, based on all constituents of the coating composition.

Wetting Agents

As wetting agents, preference is given to using anionic and nonionic surfactants having a moderate or high polarity (HLB of 7 and above) as are known to a person skilled in the art. Examples of wetting agents which can be used for the purposes of the present invention are disodium dioctylsulfosuccinate, ethoxylated 2,5,8,11-tetramethyl-6-dodecyne-5,8-diol, ethoxylated 2,4,7,9-tetramethyl-5-decyne-4,7-diol or combinations thereof, with particular preference being given to using ethoxylated 2,4,7,9-tetramethyl-5-decyne-4,7-diol.

The wetting agents are preferably used in an amount of from about 0.01 to about 1 part by weight, more preferably from about 0.05 to about 0.3 part by weight, even more preferably from about 0.1 to about 0.3 part by weight, based on all constituents of the coating composition.

Antifoams

Antifoams or antifoaming agents are used in order to prevent foam formation in the production of the coating composition according to the invention and during its application. Foam formation during application of the coating composition can lead to a nonuniform layer thickness and to holes in the coating. As antifoams, it is possible to use, for example, silicone or mineral oil. The antifoam can preferably be selected from the FINASOL product range, commercially available from TOTAL.

In the present coating composition, antifoams are used in an amount of from about 0.01 to about 1 part by weight, more preferably from about 0.05 to about 0.3 parts by weight, even more preferably from about 0.1 to about 0.2 parts by weight, based on all constituents of the coating composition.

Pigments and Dyes

Customary pigments and dyes can optionally be used in the coating composition of the invention. These are optionally added in order to achieve a different contrast, e.g. between different layers, or a stronger separating effect of the coating composition from the casting. Examples of pigments are red and yellow iron oxide. Examples of dyes are commercial dyes such as the Luconyl dye range from BASF.

The dyes and pigments are usually used in an amount of from about 0.01 to about 10 parts by weight, preferably from about 0.1 to about 5 parts by weight, based on all constituents of the coating composition.

Biocides

The coating composition can optionally (especially when the carrier liquid comprises water) contain one or more biocides in order to prevent bacterial attack and thus avoid an adverse effect on the rheology and the binding power of the binders. The biocides are not subject to any particular restrictions, but can preferably be selected from the group consisting of formaldehyde, 2-methyl-4-isothiazolin-3-one (MIT), 5-chloro-2-methyl-4-isothiazolin-3-one (CIT), 1,2-benzisothiazolin-3-one (BIT) and mixtures thereof, with further preference being given to a selection from among 2-methyl-4-isothiazolin-3-one (MIT), 1,2-benzisothiazolin-3-one (BIT) and mixtures thereof.

The proportion of the biocides in the coating composition is not subject to any particular restrictions and depends on the biocide selected. The proportion can, for example, be from about 0.001 to about 0.5 part by weight, preferably from about 0.005 to about 1.0 part by weight, more preferably from about 0.005 to about 0.5 part by weight, particularly preferably from about 0.005 to about 0.4 part by weight, even more preferably from about 0.005 to about 0.3 part by weight, based on all constituents of the coating composition.

In a preferred embodiment, a coating composition according to the invention comprises from about 30 to about 65 parts by weight of muscovite mica, from about 5 to about 35 parts by weight of clay, from about 0 to about 20 parts by weight of natural floc graphite, from about 0 to about 25 parts by weight of metakaolinite and from about 0.1 to about 2 parts by weight of attapulgite, based on the solid component. Furthermore, the coating composition contains from about 0.2 to about 2 parts by weight of binders, from about 0.1 to about 0.3 part by weight of wetting agents, from about 0.1 to about 0.2 part by weight of antifoams, from about 0.005 to about 0.3 part by weight of biocide and up to 70% by weight of carrier liquid such as water.

Production of the Coating Composition

The coating compositions of the invention are produced by conventional methods. For example, a coating composition according to the invention is produced by initially charging a major part of the carrier liquid (preferably the entire amount of the carrier liquid) and digesting clays and swellable and/or nonswellable sheet silicates (if used) therein by use of a high-shear stirrer (e.g. from about 400 to about 2000 rpm). Further solid components, for example firstly (if used) metakaolinite, then mica and (if used) graphite, pigments and dyes, are subsequently stirred in until a homogeneous mixture is formed. The order of addition plays little role, if any, here and can easily be determined by a person skilled in the art. Finally, any wetting agents, antifoams, biocides and binders, if used, are stirred in. The coating composition is, for example, produced at a temperature of preferably from about 5 to about 50° C., more preferably from about 10 to about 30° C., at a stirrer speed of preferably from about 400 to about 2000 rpm, more preferably from about 1000 to about 1500 rpm, and using a toothed disk having a d/D of preferably from about 0.3 to about 0.7, more preferably d/D=about 0.4 to about 0.6 (d=diameter of the toothed disk of the stirrer and D=diameter of the stirring vessel).

The properties of the coating composition can be set according to the desired use, e.g. as undercoat or as topcoat, and the desired layer thickness of the coating composition to be applied. In particular, the viscosity of the coating composition can be set to from about 11 sec to about 25 sec, particularly preferably from about 12 sec to about 14 sec, determined in accordance with DIN 53211; flow cup 4 mm, Ford cup.

The density of the coating composition can, for example, be from about 20° Be to about 50° Be, particularly preferably from about 25° Be to about 35° Be, determined by the Baume buoyancy method; DIN 12791.

Use of the Coating Composition

The coating composition of the invention can be used for coating a casting mold. A possible process comprises the steps:
(a) provision of a casting mold which comprises a surface which defines a casting cavity,
(b) provision of a coating composition according to the invention;
(c) application of a layer of the coating composition to at least part of the surface which defines the casting cavity;
(d) drying of the coating composition; and
(e) optionally curing the coating composition.

The term casting mold is used to refer to all types of bodies which are necessary for producing shaped castings. The casting molds are not subject to any particular restrictions: it is possible to use all casting molds customary in the iron, steel and nonferrous metals industry, for example cores, molds or chill molds. The casting molds can consist of a refractory, particulate base mold material which is strengthened by means of a curable binder. The refractory, particulate base mold material is not subject to any particular restrictions: it is possible to use any customary base mold material. The refractory, particulate base mold material can preferably comprise silica sand, zircon sand, chromite sand, chamotte, bauxite, olivine sand, feldspar-containing sand, andalusite sand, hollow aluminum silicate spheres (also referred to as "microspheres"), glass beads, granulated glass, the spherical ceramic base mold materials known under the name "Cerabeads" or "Carboaccucast" or mixtures thereof. The curable binder is not subject to any particular restrictions. Any curable binder known to a person skilled in the art can be used. Preference is given to using organic binders such as polyurethane, furan resin or epoxy-acrylate binders, inorganic binders such as water glass or mixtures thereof; the binders can particularly preferably be based on PUR cold box binders, water glass-$CO_2$ binders, resol-methyl formate (MF), resol-$CO_2$ binders, furan resin, phenolic resin or water glass-ester binders. The proportion of the curable binder in the casting mold is not subject to any particular restrictions: the binder can be present in any conventional proportion. The proportion of the binder is preferably from about 0.2 to about 5 parts by weight, more preferably from about 0.3 to about 4 parts by weight, particularly preferably from about 0.4 to about 3 parts by weight, based on 100 parts by weight of refractory, particulate base mold material. The coating compositions are suitable for all conceivable applications in which coating of casting molds with coating compositions is desired. As examples of casting molds, i.e. for cores and molds in foundry applications, mention may be made of sand cores which are bonded by PUR cold box binders, water glass-$CO_2$ binders, resol-MF binders, resol-$CO_2$ binders, furan resin binders, phenolic resin binders or water glass-esters. Other examples of preferred casting molds which can be coated with the coating compositions of the invention are, for example, described in "Formstoffe and Formverfahren", Eckart Flemming and Werner Tilch, Wiley-VCH, 1993, ISBN 3-527-30920-9.

The surfaces of the casting mold define a casting cavity into which the liquid metal is introduced. The surfaces of a casting mold can be surfaces of a core or a hollow mold. According to the invention, the casting molds can be entirely or partly coated. Preference is given to coating the surfaces of the casting mold which come into contact with the metal being cast.

The coating composition firstly has to be provided in a ready-to-use form. If it is present as dry powder or as concentrate, carrier liquid is added in order to achieve the consistency necessary for application.

In one embodiment, the coating composition can, for example, be present in the form of a kit (multicomponent pack which contains two or more containers for different components). Here, the solid component and the carrier liquid can be present next to one another in separate containers. All constituents of the solid component can be present as pulverulent solids mixture in one container. As an alternative, the constituents of the solid component can be provided as a plurality of separate components. Further components which are optionally to be used, for example binders, wetting agents, antifoams, pigments, dyes and biocides, can be present together with the abovementioned components or in one or more separate containers in this kit. The carrier liquid can either comprise the components which are optionally to be used in addition, for example in a joint container, or they can be present separately from further optional constituents in a separate container. To produce a ready-to-use coating composition, the appropriate amounts of the components are mixed with one another.

As an alternative, the coating composition can be present as aqueous coating composition, with the carrier liquid being able to be water. Addition of an alcohol enables a ready-to-use alcohol coating composition to be provided from this aqueous coating composition.

The application and drying of at least one layer of a coating composition on at least part of the surface which defines the casting cavity is not subject to any particular restrictions. It is possible to use all conventional methods of application described in the technical field for this purpose. Examples of preferred methods of application are dipping, flooding, spraying and painting. Conventional methods of application are discussed, for example, in "Formstoffe and Formverfahren", Eckart Flemming and Werner Tilch, Wiley-VCH, 1993, ISBN 3-527-30920-9.

In the case of dipping as method of application, the casting mold is, for example, dipped into a container containing a ready-to-use coating composition for from about 1 second to about 2 minutes. The time taken for the excess coating composition to run off after dipping depends on the running-off behavior of the coating composition used. After a sufficient running-off time, the coated casting mold is subjected to drying.

In the case of spraying as method of application, commercial pressure vessel spray apparatuses are used. Here, the ready-to-use coating composition is, for example, introduced into a pressure vessel. The coating composition can be pushed by the superatmospheric pressure to be set into a spray gun where it is sprayed by means of atomization air which can be regulated separately. During spraying, care should preferably be taken to ensure that the gun is set so that the pressure for the coating composition and the atomization air is set so that the sprayed coating composition is still wet when impinging on the surface of the casting mold but gives a uniform applied coating. The application of the coating composition can be effected in one or more layers. When a plurality of layers are applied, each individual layer can be completely or partially dried after application.

As drying methods, it is possible to employ all drying methods which are conventional in the technical field, for example allowing to dry in air, drying by means of dehumidified air, drying by means of microwave or infrared radiation, drying in convection ovens, and the like. In a preferred embodiment of the invention, the coated casting mold is dried at from about 100 to about 250° C., more preferably from about 120 to about 180° C., in a convection oven. When alcohol coating compositions are used, the coating composition is preferably dried by burning off the alcohol or alcohol mixture. Here, the coated casting mold is additionally heated by the heat of combustion. In a further preferred embodiment, the coated casting mold is dried in air without further treatment.

The dry layer thickness of the dried coating resulting from the above-described coating composition is not subject to any particular restrictions. The dry layer thickness here is the layer thickness of the dried coating composition ("wash") which has been obtained by drying of the coating composition by essentially complete removal of the carrier liquid and optionally subsequent curing. The dry layer thickness of the coating can preferably be from about 0.1 mm to about 1 mm, more preferably from about 0.2 mm to about 0.8 mm, particularly preferably from about 0.3 mm to about 0.6 mm. The dry layer thickness of the coating is preferably determined either by measuring bending test bars before and after coating with the coating (dried) using a screw micrometer or by measurement using a wet layer thickness comb. The comb can, for example, be used to determine the layer thickness by scraping away the coating at the end marks of the comb until the substrate appears. The layer thickness can then be read off from the markings of the teeth. An alternative is to measure the wet layer thickness in the matted state in accordance with DIN EN ISO 2808, with the dry layer thickness then being from 70 to 80% of the thickness of the matted layer. A "matted" layer is a layer which is no longer capable of flowing and in which the proportion of solvent has been reduced to such an extent that the surface is no longer glossy.

If the casting mold is to be coated with an undercoat and a topcoat, the process of the invention comprises the following steps:
 (i) provision of a casting mold which comprises a surface which defines a casting cavity,
 (ii) provision of a coating composition according to the invention;
 (iii) application of a layer of the undercoat to at least part of the surface which defines the casting cavity and optionally drying the undercoat; and
 (iv) application of a layer of the topcoat to at least part of the surface which defines the casting cavity and/or to the layer of the undercoat (preferably to the layer of the undercoat); and
 (v) drying of the topcoat and (if not yet completely dried) the undercoat.

The coating composition of the invention is used as undercoat and/or as topcoat (preferably as topcoat). If the coating composition of the invention is used both as undercoat and as topcoat, the coating compositions of the undercoat and of the topcoat are identical or different (preferably different).

The dry layer thickness of the undercoat is, for example, from about 0.01 mm to about 1 mm, preferably from about 0.05 mm to about 0.8 mm, more preferably from about 0.1 mm to about 0.6 mm and most preferably from about 0.2 mm to about 0.3 mm.

The dry layer thickness of the topcoat is, for example, from about 0.01 mm to about 1 mm, preferably from about 0.05 mm to about 0.8 mm, more preferably from about 0.1 mm to about 0.6 mm and most preferably from about 0.2 mm to about 0.3 mm.

If the coating composition according to the invention is not used as undercoat, any conventional undercoat can be used. The undercoat can contain, for example, clays, talc, quartz, mica, zirconium silicate, magnesite, aluminum silicate and chamotte as base materials. These base materials are the purpose-determining part of the undercoat. They cover the casting mold surface, close the sand pores against intrusion of the metal being cast and also serve, inter alia, as thermal insulation from the casting mold. Both aqueous coating compositions and alcohol coating compositions can be used as undercoat.

Casting molds which have been coated according to the invention are preferably used for producing metal bodies. They are particularly suitable for producing engines and engine components, brake disks, turbochargers, exhaust manifolds and general machine components.

In a casting process, a casting mold which has been coated according to the invention is provided, liquid metal is introduced and the casting mold is removed after solidification of the metal.

The following examples illustrate the invention, without restricting the invention.

EXAMPLES

Example 1

A coating composition for coating a casting mold was obtained as follows:

Clay (Kärlicher blue clay, yellow-firing T7001 KTS, Kärlicher Ton and Schamottewerke Mannheim GmbH & Co. KG, 56218 Mülheim-Kärlich, Germany; Chemical analysis, in % by mass ignited: $SiO_2$ 53.66, $Al_2O_3$ from 36 to 38, $TiO_2$ 3.75, $Fe_2O_3$ 2.98, CaO 0.73, MgO 0.63, $K_2O$ 0.75, $Na_2O$ 0.07; sedimentation analysis by means of sedigraph measurement in % by mass: <2.0 μm 95.7, mineral analysis in % by mass: kaolinite from 70 to 75, illite 7.0, montmorillonite from 15 to 20, quartz 2.0, Fe—Ti minerals 3.0), mica (from Georg H. Luh GmbH, 65396 Walluf, Germany; chemical analysis in % by mass: $SiO_2$ from 43 to 46, $Al_2O_3$ from 33 to 37, $Fe_2O_3$ from 2 to 5, $K_2O$ from 9 to 11; sieve analysis passage through 60 μm sieve: from 25 to 64%), and graphite (from Georg H. Luh GmbH, 65396 Walluf, Germany; C content min. 85%, ash max. 15%; particle size distribution determined by laser measurement method: D10 from 15 to 30 μm, D50 from 80 to 120 μm, D90 from 190 to 250 μm), were mixed with a premix consisting of 1 part by weight of attapulgite (Attagel 40 from BASF, 67063 Ludwigshafen, Germany), 2 parts by weight of polyvinyl alcohol binder (Polyviol, Wacker AG, 81737 Munich, Germany), 0.2 parts by weight of wetting agent consisting of nonionic surfactant (Surfynol 440, Evonik Corporation Allentown, Pa. 18195, US), 0.2 parts by weight of antifoam (Finasol, Total Deutschland GmbH, 10117 Berlin, Germany), 0.2% of biocide (Acticide MBS (BIT, MIT) from Thor GmbH, 67346 Speyer, Germany) and 60% by weight of water and brought by means of additional water to a viscosity of about 13 s DIN 4 mm.

Shaped bodies having the dimensions 240 mm length×20 mm width×15 mm height were produced from sand H32 from Quarzwerke Gruppe together with 0.4% of ASKOCURE 388 and 0.4% of ASKOCURE 666 by treatment with amine gas.

The diluted coating composition was subsequently, after having been stirred up, introduced into a 250 ml measuring cylinder and the shaped bodies were manually dipped in for 5 s and subsequently dried at 120° C. in a drying oven. A dry layer thickness of about 300-400 μm was obtained.

The dried cores were freed of the coating composition at the core marks and the mirror surface by rubbing off so that no compressive stress arises and were glued into a vertically divided stack mold having 3 horizontal positions for cores composed of water glass/ester-cured sand H32 by means of ASKOBOND RAPID A. After assembly and clamping of the mold packet by means of screw clamps, casting was in each case carried out at 1420° C. using gray cast iron GJL 200.

After cooling and unpacking of the castings, these were freed on the outside of adhering sand by means of a spatula and a wire brush. The sand core was then shaken out using a compressed air chisel at a marked position for 10 seconds at 6 bar. The cavity of the core was subsequently blown out by means of an air gun using a pressure of 7 bar, so that most of the coating composition was also blown off. Finally, the remaining dirt in the cavity was removed by means of a narrow wire brush and screwdriver and, after removal of metallic parts by means of magnets, weighed.

Example 2

Further coating compositions according to the invention were obtained as described in example 1 with the difference that the proportions of the solid component as described in table 1 were mixed with the premix used in example 1. The shaped bodies obtained in this way were examined in respect of residue and flash as in example 1.

TABLE 1

| Sequential no. | Sum of clay, mica, graphite, metakaolinite | Clay | Mica | Metakaolinite | Graphite | Pyrophyllite | Attapulgite | Sum of the solid components | Residue (g) |
|---|---|---|---|---|---|---|---|---|---|
| 1 | 86 | 22 | 31 | 18 | 15 | 13 | 1 | 100 | 1.09 |
| 2 | 99 | 26 | 46 | 12 | 15 | 0 | 1 | 100 | 0.40 |
| 3 | 99 | 27 | 45 | 12 | 15 | 0 | 1 | 100 | 1.09 |
| 4 | 99 | 26 | 46 | 12 | 15 | 0 | 1 | 100 | 0.74 |
| 5 | 99 | 25 | 48 | 12 | 14 | 0 | 1 | 100 | 0.96 |
| 6 | 99 | 33 | 47 | 0 | 19 | 0 | 1 | 100 | 1.00 |
| 7 | 99 | 12 | 57 | 17 | 13 | 0 | 1 | 100 | 0.92 |
| 8 | 99 | 26 | 47 | 11 | 15 | 0 | 1 | 100 | 0.77 |
| 6 | 99 | 27 | 45 | 12 | 15 | 0 | 1 | 100 | 0.81 |
| 10 | 99 | 26 | 46 | 12 | 15 | 0 | 1 | 100 | 0.64 |
| 11 | 99 | 24 | 41 | 20 | 14 | 0 | 1 | 100 | 1.79 |
| 12 | 86 | 24 | 42 | 20 | 0 | 13 | 1 | 100 | 1.66 |
| 13 | 66 | 24 | 42 | 0 | 0 | 33 | 1 | 100 | 0.62 |

Example 3 (According to the Invention)

A coating composition having the following composition was applied as described above and characterized in respect of the residue and the presence of flash and also penetrations:

| | |
|---|---|
| Water | 65.5% by weight |
| Mica (muscovite, D50 = 90 μm) | 16.0% by weight |
| Graphite (D50 = 70 μm) | 5.0% by weight |
| Kärlicher blue clay T 7001 | 10.0% by weight |
| Polyvinyl alcohol solution 25% strength | 1.5% by weight |
| Attapulgite | 1.0% by weight |
| Biocide, wetting agent and antifoam | 1.0% by weight |

Here, a residue of only 0.40 g was determined in the case of shaped body 2. As can additionally be seen from FIG. 1, the shaped body displays no flash or penetrations. The coating composition could be removed readily from the castings and left a small amount of residue.

Example 4 (Not According to the Invention)

A comparison was made here with a coating composition having the following composition which is not according to the invention, which is customary in automobile casting:

| | |
|---|---|
| Water | 49.5% by weight |
| Pyrophyllite (D50 = 60 μm) | 45.0% by weight |
| Iron oxide (D50 = 2 μm) | 2.0% by weight |
| Polyvinyl alcohol solution 25% | 1.5% by weight |
| Attapulgite | 1.0% by weight |
| Biocides, wetting agents and antifoams | 1.0% by weight |

Example 5 (Not According to the Invention)

Further coating compositions which are not according to the invention were obtained as described in example 1, with the difference that the proportions of the solid component as described in table 2 were mixed with the premix used in example 1. The shaped bodies obtained in this way were examined in respect of residue and flash as in example 1.

preheated to 1300° C. or 1450° C. and heated for 3 minutes. The sintering behavior was subsequently compared visually.

The pyrophyllite-containing coating compositions in particular displayed a compact appearance, while the coating compositions according to the invention looked as if they had been foamed.

It is presumed that significantly better peeling-off of the coating composition after casting and thus less residual dirt is brought about by the foaming of the coating composition during sintering.

The invention claimed is:

1. A coating composition comprising a solid component comprising a clay and mica, wherein the clay comprises from about 50 to about 90% by weight of kaolinite and from about 5 to about 35% by weight of montmorillonite, and the coating composition comprises, based on the solid component, from about 5 to about 50 parts by weight of clay and from about 10 to about 80 parts by weight of mica, wherein the ratio of mica to clay is from about 1:1 to about 5:1 (weight/weight).

2. The coating composition as claimed in claim 1, wherein the solid component further comprises metakaolinite and graphite.

3. The coating composition as claimed in claim 2, wherein the sum of clay, mica, metakaolinite (if present) and graphite is, based on the solid component, from about 20 to about 100% by weight.

4. The coating composition as claimed in claim 1, wherein the coating composition comprises, based on the solid component, from about 5 to about 40 parts by weight of clay.

5. The coating composition as claimed in claim 1, wherein the coating composition comprises, based on the solid component, from about 0 to about 35 parts by weight, preferably from about 0 to about 30 parts by weight and particularly preferably from about 0 to about 25 parts by weight, of metakaolinite.

6. The coating composition as claimed in claim 1, wherein the coating composition comprises, based on the solid component, from about 0 to about 30 parts by weight of graphite.

7. The coating composition as claimed in claim 1, wherein the coating composition further comprises a carrier liquid, with the carrier liquid comprising water.

TABLE 2

| Sequential no. | Sum of clay, mica, graphite, metakaolinite | Clay | Mica | Metakaolinite | Graphite | Pyrophyllite | Attapulgite | Sum of the solid components | Residue (g) | Further characteristics |
|---|---|---|---|---|---|---|---|---|---|---|
| 14 | 7 | 0 | 7 | 0 | 0 | 92 | 1 | 100 | 1.24 | |
| 15 | 13 | 9 | 0 | 0 | 4 | 86 | 1 | 100 | 3.01 | Fl. |
| 16 | 65 | 0 | 45 | 0 | 20 | 34 | 1 | 100 | 1.71 | |
| 17 | 58 | 24 | 0 | 20 | 14 | 41 | 1 | 100 | 2.14 | |
| 18 | 44 | 24 | 0 | 20 | 0 | 55 | 1 | 100 | 2.41 | |
| 19 | 63 | 18 | 9 | 18 | 18 | 36 | 1 | 100 | 1.79 | |
| 20 | 32 | 9 | 5 | 9 | 9 | 67 | 1 | 100 | 1.01 | |
| 21 | 54 | 18 | 9 | 9 | 18 | 45 | 1 | 100 | 1.67 | |
| 22 | 28 | 9 | 5 | 5 | 9 | 71 | 1 | 100 | 1.84 | |

Figure 2:
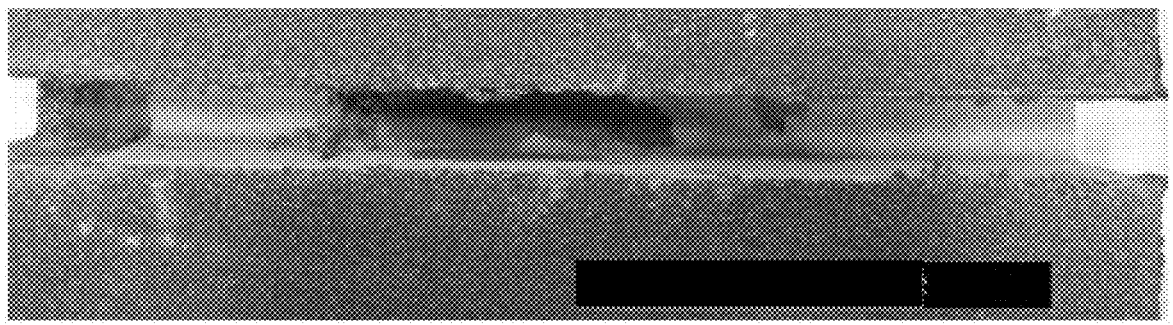
FIG. 2: casting obtained using a coating composition which is not according to the invention. The casting has a high level of residue and flash.

Here, a large residue of 3.01 g was determined in the case of shaped body 15. As can also be seen from FIG. 2, the shaped body 15 displays noticeable flash (Fl.).

Physical Properties of the Coating Composition:

Samples of the coating compositions listed above for the casting test were dried, ground in a mortar and introduced into porcelain boats and subsequently placed in a furnace 8. The coating composition as claimed in claim 1, wherein the coating composition comprises, based on the solid component, from about 20 to about 70 parts by weight of mica.

9. The coating composition as claimed in claim 1, wherein the coating composition comprises, based on the solid component, from about 30 to about 65 parts by weight of mica.

10. The coating composition as claimed in claim 1, wherein the ratio of mica to clay is from about 1.3:1 to about 3:1 (weight/weight).

11. The coating composition as claimed in claim 1, wherein the ratio of mica to clay is from about 1.4:1 to about 2.5:1 (weight/weight).

12. The coating composition as claimed in claim 3, wherein the sum of clay, mica, metakaolinite and graphite is, based on the solid component, from about 25 to about 100% by weight.

13. The coating composition as claimed in claim 12, wherein the sum of clay, mica, metakaolinite and graphite is, based on the solid component, from about 30 to about 100% by weight.

14. The coating composition as claimed in claim 1, wherein the coating composition comprises, based on the solid component, from about 5 to about 35 parts by weight of clay.

15. The coating composition as claimed in claim 1, wherein the coating composition comprises, based on the solid component, from about 0 to about 25 parts by of graphite.

16. The coating composition as claimed in claim 1, wherein the coating composition comprises, based on the solid component, from about 0 to 20 parts by weight of graphite.

17. A process for coating a casting mold, wherein the process comprises the steps:
    (a) providing a casting mold comprising a surface which defines a casting cavity,
    (b) providing a coating composition as claimed in claim 1;
    (c) applying a layer of the coating composition to at least one part of the surface which defines the casting cavity; and
    (d) drying the coating composition.

* * * * *